United States Patent [19]

Karuks et al.

[11] 4,395,159

[45] Jul. 26, 1983

[54] MECHANICAL PROTECTION COATING FOR COATED METAL SUBSTRATE

[75] Inventors: Ergo Karuks, Don Mills; Martin Rohn, Willowdale, both of Canada

[73] Assignee: FRC Composites Limited, Don Mills, Canada

[21] Appl. No.: 235,719

[22] Filed: Feb. 18, 1981

[30] Foreign Application Priority Data

Jun. 6, 1980 [CA] Canada ............................ 353491

[51] Int. Cl.³ .............................................. F16L 1/04
[52] U.S. Cl. ................................. 405/172; 427/403; 138/103; 138/110; 138/146; 138/DIG. 6; 405/158
[58] Field of Search ............... 138/143, 175, 145, 146, 138/103, 110; 405/158, 172; 428/703, 36; 427/403

[56] References Cited

U.S. PATENT DOCUMENTS

| 3,354,169 | 11/1967 | Shafer | 428/36 |
|---|---|---|---|
| 3,357,851 | 12/1967 | Montgomery | 138/146 |
| 3,955,606 | 5/1976 | Tanburello | 138/175 |
| 4,209,555 | 6/1980 | Stewart | 427/397.8 |
| 4,213,486 | 7/1980 | Samour | 428/36 |

FOREIGN PATENT DOCUMENTS

| 804358 | 11/1958 | United Kingdom | 428/703 |
|---|---|---|---|
| 2004971 | 4/1979 | United Kingdom | 138/143 |

*Primary Examiner*—Sam Silverberg
*Attorney, Agent, or Firm*—Rogers, Bereskin & Parr

[57] ABSTRACT

A cementitious coating is applied to a thin smooth, corrosion-protective coating of a pipe to protect the corrosion-protective coating against physical damage and hostile environments. The cementitious coating adheres to the corrosion-protective coating, is typically between 0.5 and 5.0 millimeters in thickness, and contains a cementitious material such as portland cement, a polymeric material such as an acrylic polymer, and may also contain chopped fibres such as glass fibres and a filler material such as silica sand. The cementitious coating has sufficient conductivity to permit a cathodic protection current to flow therethrough. The cementitious coating may also be applied to the corrosion protective coating of the metal substrates. Polymer bonded coatings may alternatively be so applied, to protect the corrosion protective coating.

16 Claims, 2 Drawing Figures

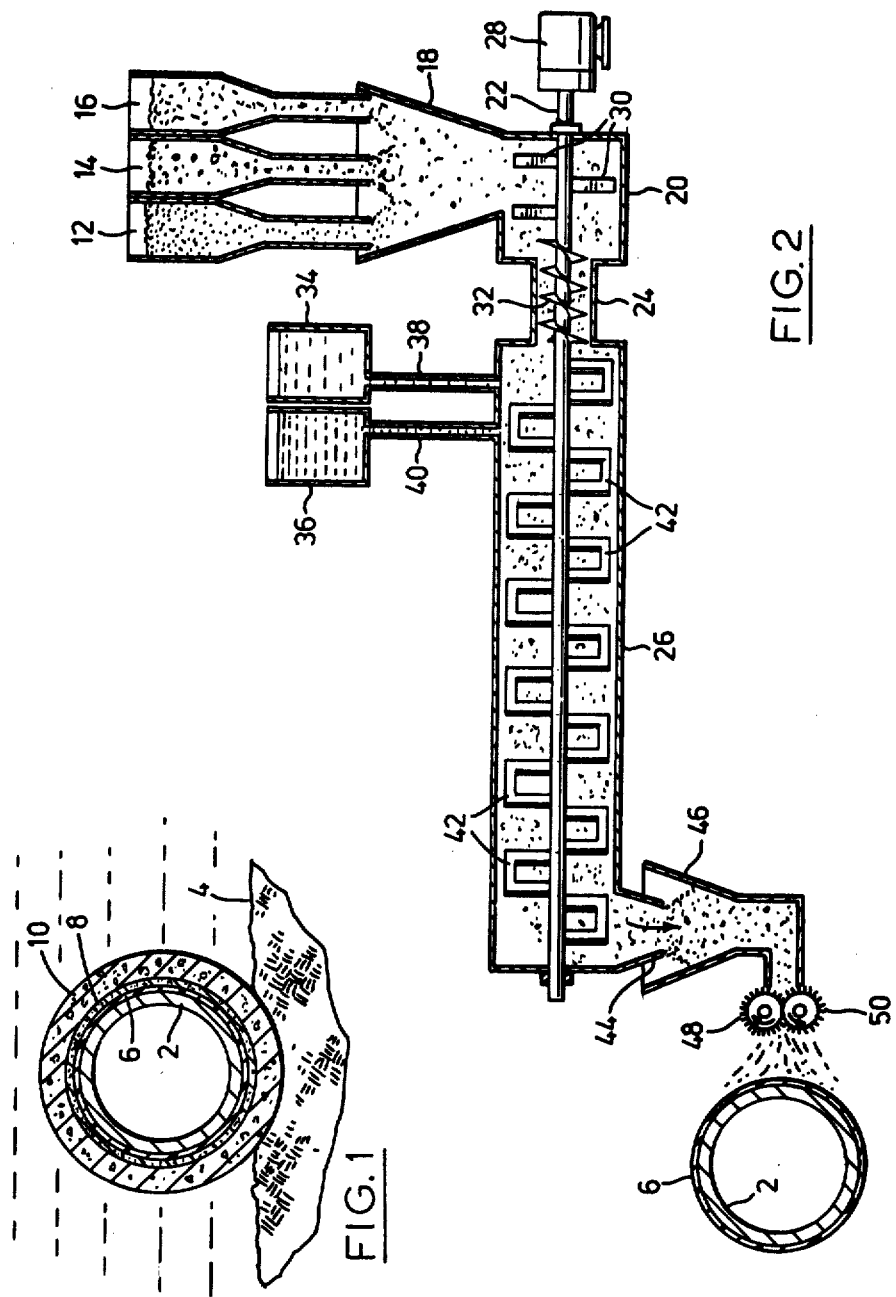

MECHANICAL PROTECTION COATING FOR COATED METAL SUBSTRATE

This invention relates to a protection coating of a corrosion-resistant coating on a metal substrate against physical damage and hostile environments. The invention will be described primarily in connection with pipes but may also be used in other applications.

Pipes are commonly used to conduct water, gas, oil and other materials. These pipes are often submerged, buried in the ground or exposed without protection against the environment, and under most circumstances, the pipes may undergo considerable corrosion. To deal with this problem it is common to apply a thin corrosion protective coating, typically an epoxy or polyethylene coating, to the pipes. A serious problem with such a coating has been that it is likely to be damaged during handling, storage, preparation, transportation and installation of the pipe. Rough handling with normal transporting equipment as well as banging pipes against one another will often impair the coatings. Coatings on overland pipes risk damage when placed in trenches through rough terrain and when backfilled with course material. Even during storage, many of these coatings can deteriorate simply by exposure to normal ultra-violet radiation. Another common source of damage to coatings occurs when submarine pipes receive a "weight" coating, usually concrete, to keep them submerged under water. These "weight" coatings are usually applied on the pipe so aggressively that the impact of the aggregates penetrate the thin corrosion protective coating.

The present invention in one aspect provides a thin protective coating for corrosion protected pipes, which coating is formed from cementitious material. The cementitious coating surprisingly will adhere to the corrosion protection coating. In addition it is found that some cementitious coating formulations of the invention can bend as the pipe is being installed, without coming off the pipe, and at the same time, still provide protection against chipping and damage to the corrosion protective coating.

Thus in one aspect the present invention provides in combination with a metal pipe having a corrosion-protecting coating thereon, a thin cementitious coating to provide protection for said corrosion protective coating, said cementitious coating comprising: a cementitious material, a fine filler material of quantity in the range of 0 to 3.5 parts by weight per part of said cementitious material, a polymeric material of quantity in the range 0.05 to 0.55 parts by weight of polymer solids per part of said cementitious material, chopped fibres or flakes of quantity in the range 0 to 0.20 parts by weight per part of said cementitious material, the thickness of said cementitious coating being between 0.5 and 5.0 millimeters, said coating adhering to said corrosion-protective coating.

Since many pipes are cathodically protected and require current flow through their exterior surface (as will be explained hereinafter) the coating of the invention in a preferred aspect also has sufficient electrical conductivity for this purpose.

Further aspects of the invention will be described and are referred to in the appended claims.

Preferred embodiments of the present invention will now be described, with reference to the accompanying drawings, in which:

FIG. 1 shows in cross section pipe having a coating applied according to the invention; and FIG. 2 is a diagrammatic view of a plant for applying a coating of the invention.

The present invention deals with steel, iron or other pipes which have a thin corrosion-protective coating thereon. Such coating is commonly an epoxy coating but may also be polyethylene, coal tar, polyurethane or other commonly used, thin protective coatings. It is usually applied in a thickness ranging between about 0.25 and 3 millimeters. Although the corrosion protective coating is usually adhered to the pipe, it can also be in the form of a sleeve tightly wrapped around the pipe, e.g. a polyethylene sleeve, or a shrink-wrapped sleeve. Typical epoxy coatings are those sold by Mobile Oil Co. under its numbers 1004 and 1003-R, and by the 3M Company under its number 206N.

The mechanical protection coating of the invention employs a cementitious material. By "cementitious material" is meant inorganic calcium oxide cement based hardenable materials, such as portland cements, slag cements, and calcium aluminate cements.

Preferably, although not necessarily, fibres are mixed with the cementitious material to improve its flexibility and to provide impact resistance. The fibres may be mineral fibres such as asbestos, glass or rock, manmade fibres such as nylon, polypropylene, rayon, polyesters, polyacrylics, polyethylene, or polyurethane, or they may be natural fibres such as cellulose, cotton, silk, wool, hemp, sisa, jute or flax. They may also be in the form of small flakes, e.g. mica flakes. The longevity of the fibres is not particularly important, since after the pipe has been installed, the fibres can be permitted to deteriorate. The fibres are very small, typically between about 0.25 and 0.5 inch in length and 0.0025 inches in diameter, since larger pieces would be less suitable for a thin cementitious coating.

The coating of the invention also includes a polymeric material, the function of which is to strengthen the coating and to improve its adhesion to the smooth corrosion resistant coating to which it is applied. Suitable polymeric materials for use in the coatings of the present invention are those which are compatible with cementitious materials and include vinyl acetate polymers and copolymers, styrene polymers and copolymers, vinyl chloride polymers and copolymers, butadiene polymers and copolymers, and arcylic polymers and copolymers. The polymer solids are typically provided in the form of an aqueous dispersion. The preferred polymeric materials are acrylic polymers in particular acrylic polymers containing some or all of methacrylate, acrylate and acrylic acid groups, styrene-/butadiene copolymers and polyvinyl chloride. It should be noted that some polymers are more suitable than others for a particular purpose. For instance, when the coating is intended for use in an application in which it is exposed to ultra-violet light, acrylic polymers are particularly suitable.

The cementitious coating of the invention may also incorporate fillers such as silica sand, trap rock screenings, slag from iron ore or steel operations, iron ore itself, calcined bauxite, mica, barite, and nephylene synite. It will be appreciated that the fillers used in the cement formulations differ throughout the world. Their particle size distribution, particle shape and porosity may affect the cement and water demand, workability and durability of the coating.

The coating of the invention may also include other additives such as air entraining agents, defoamers, pigments and other chemical additives to enhance the performance of the coating.

The thickness of the cementitious coating applied according to the invention will range between 0.5 millimeters and 5 millimeters, preferably between 1 and 3 millimeters. Coatings of less than 1 millimeter would normally be used for ultra-violet protection coatings whereas thicker coatings are used primarily for physical protection.

The quantity of filler used according to the invention will vary between 0 and 3.5 parts by weight per part of cementitious material, and preferably between 1.0 and 3.0 parts by weight per part of cementitious material. The filler is a fine material, such as sand (in contrast to the course aggregate (e.g. stone and gravel) used in concrete) so that the impact of the coating materials during application of the coating will not damage the corrosion protective coating already on the pipe.

The quantity of polymeric solids used will vary between 0.05 and 0.55 parts by weight per part of cementitious material, preferably between 0.1 and 0.3 parts by weight per part of cementitious material. The preferred polymers for use in the lower ranges are the acrylic polymers whereas styrene/butadiene polymers are preferably used above 0.15 parts.

The quantity of fibres or flakes used may vary between 0 and 0.20 parts by weight per part of cementitious material, preferably between 0.01 and 0.10 parts by weight per part of cementitious material.

In the preparation of the cementitious coating of the invention, the selected materials are mixed together, commonly with water (as will be indicated in the following examples). The resulting material, after mixing, is a thick mixture, which is then applied to the corrosion-protective coating of the pipe. The mixture may be applied by feeding it, for example, by a screw conveyer, between two counter rotating brushes which hurl the mixture onto the pipe. The pipe is rotated in front of the brushes and the mixture is applied along the entire length of the pipe by either translating the rotating pipe past the brushes or moving the brushes along the length of the rotating pipe.

The coatings of the invention can be applied at a temperature between 5° C. and a temperature sufficiently below the false or flash setting temperature of the mixture. A preferred temperature of the mixture is about 16° C. The lower temperatures may be used when the temperature of the pipe is elevated. However, it will be appreciated by those skilled in the art that the application of a coating at 5° C. to cold pipe would not provide an acceptable coating.

The following are illustrative specific examples. In the examples, proportions are expressed in parts by weight.

EXAMPLE 1

A mortar was prepared, consisting of 100 parts of portland cement, 31 parts of a product sold under the trade mark Rhoplex MC-76 by Rohm & Haas Co. (a dispersion of 47 parts acrylic polymer and 53 parts water) and 18 parts water. The resulting mortar was applied to an epoxy coated pipe by spraying to form a coating of thickness 0.5 millimeters. The lack of fibres in the material permitted an extremely thin coating, which provided resistance to penetration by ultra-voilet light.

EXAMPLE 2

A mortar was prepared consisting of 100 parts portland cement, 115 parts Rhoplex MC-76 and 11 parts of an additive sold commercially under the number FRCA501 by FRC Composites Limited, of Don Mills, Ontario, Canada. This additive includes the water required for the mortar and acts as a thickner to assist the material to be spread evenly. The mortar was then applied to an epoxy coated pipe by spraying to form a coating of thickness 0.5 millimeters. The results were similar to those of Example 1.

EXAMPLE 3

A mortar was prepared consisting of 100 parts portland cement, 31 parts Rhoplex E-330 (a dispersion of 47 parts acrylic polymer and 53 parts water), 250 parts silica sand, 2.5 parts glass fibres, and 22 parts water. The fibres were one quarter inch in length. The mortar was then applied by rotating brushes onto an epoxy coated pipe to form a coating of 2.5 millimeters in thickness.

It was found that the coating in this example has excellent impact resistance, high adhesion, and despite its greater thickness, had sufficient flexibility so that the pipe could be worked and even bent slightly during installation, without the coating falling off.

EXAMPLE 4

Example 3 was repeated with the exception that a product sold under the trade mark Dow-460 by the Dow Chemical Company was used in place of the Rhoplex E-330 Dow-460 is a dispersion of about 48 parts of a butadiene/styrene rubber in 52 parts water. Similar results were obtained as in Example 3.

EXAMPLE 5

Example 3 was repeated with the exception that a product sold under the trade mark Dylex-1186 by the Atlantic Richfield Company was used in place of the Rhoplex E-330. Dylex-1186 is a styrene/butadiene rubber in the form of a dispersion of about 48 parts of the rubber in 52 parts of water. Similar results were obtained as were obtained in Example 3.

EXAMPLE 6

Example 3 was repeated with the exception that a product sold under the trade mark 97-314 Tylac by Reichhold Chemicals Inc. was used in place of Rhoplex E-330. 97-314 Tylac is a dispersion of about 48 parts of a styrene/butadiene rubber in 52 parts of water. Similar results were obtained to those obtained in Example 3.

EXAMPLE 7

Example 3 was repeated with the exception that a product sold under the trade mark 40-155 Plyamul by Reichhold Chemicals Inc. was used in place of Rhoplex E-330. 40-155 Plyamul is a dispersion of approximately 55 parts polyvinyl acetate in 45 parts water. Similar results were obtained to those obtained in Example 3.

EXAMPLE 8

A mortar was prepared consisting of 100 parts portland cement, 31 parts Rhoplex MC-76, 150 parts silica sand, 1.5 parts short, fine chopped glass fibers, and 10 parts water The mortar was applied to an epoxy coated pipe by the counter rotating brushes to form a cementitious coating 4 millimeters in thickness. It was found that the coating, because of its thickness had a very high impact resistance and mechanical strength, and at the same time possessed some flexibility, although less than that of Example 3 because of the greater thickness of the coating.

EXAMPLE 9

Example 8 was repeated with the exception that the product Dow-460 was used in place of Rhoplex MC-76. Similar results were obtained as were obtained in Example 8.

EXAMPLE 10

Example 8 was repeated with the exception that Dylex-1186 was used in place of Rhoplex MC-76. Similar results were obtained as were obtained in Example 8.

EXAMPLE 11

Example 8 was repeated with the exception that 97-314 Tylac was used in place of Rhoplex MC-76. Similar results were obtained as were obtained in Example 8.

EXAMPLE 12

Example 8 was repeated with the exception that 40-155 Plyamul was used in place of Rhoplex MC-76. Similar results were obtained as were obtained in Example 8.

EXAMPLE 13

A mortar was prepared consisting of 100 parts portland cement, 11 parts Rhoplex MC-76, 350 parts silica sand, and 44 parts water. The mortar was applied by counter rotating brushes to an epoxy coated pipe to form a coating 4 millimeters in thickness.

The coating so formed had high impact strength, although less than that of Example 8, because of the absence of fibre. In addition the flexibility was less than that of Example 8 because of the smaller amount of polymer used.

In the above indicated examples, the pipes after being coated with the cementitious material could be handled to a limited extent after ten minutes and could be rolled on themselves after 30 minutes, when cured at room temperature. The rate of curing of course will increase at higher temperatures and will decrease at lower temperatures.

It is found that the cementitious coating of the invention adheres adequately to most epoxy and coal tar corrosion protective coatings without special surface preparation of the epoxy other than ensuring adequate cleanliness. However if the corrosion protective coating is very smooth or slippery, as is the case for most polyethylenes, then it is desirable either to mechanically roughen the surface or to pretreat it chemically before applying the cementitious coating. This will assist in adhesion of the cementitious coating.

A major application of the invention is pipes used for pipelines. The pipe sections used in pipelines are often very long, e.g. 40 feet or more, and must extend up and down hills and around curves. Such pipe sections will inevitably undergo some gentle bending. It is found that the cementitious coating of the invention can be made to adhere to the smooth corrosion protective coating of the pipe even under these circumstances. It should be noted, however, that the thicker the cementitious coating and the lower the polymer loading, the more likely the cementitious coating is to flake off. Thus the thicker coatings of three to four millimeter thickness with low polymer loading, for example those of Example 8 and particularly of Example 13, will allow very little or no bending without at least some flaking. The coating of Example 3 will allow considerably more bending without flaking.

Provided that a suitable cementitious coating is applied, then when the pipe is gently bent, the cementitious coating will crack, but it will not normally flake off. Even when cracked, the cementitious coating will provide considerable protection to the corrosion protective coating against mechanical damage from machinery and from aggregates hurled at the pipe. It may be noted that the impact of aggregates can be very severe; in weight coatings for submarine pipelines, for example, large aggregates are used to obtain as dense a weight coating as possible, and they may impact the pipe at speeds in excess of 80 miles per hour.

As previously mentioned, most pipelines are cathodically protected. Although the corrosion protective coating is of course intended to resist corrosion, cathodic protection is necessary as a backup in case of damage to the corrosion protective coating. Cathodic protection involves establishing a current opposite to the corrosion generated current, and the counter current must flow through the cementitious coating. The cementitious coating in such applications must have a low enough resistance to permit the flow of sufficient protective current.

The very small thickness of the cementitious coating reduces its resistance, since resistance is a linear function of thickness. In addition, the amount of cement used in certain coatings of the invention is relatively low, increasing its porosity and hence its water absorption, which increases the electrical conductivity of the cementitious coating. The resistance of the cementitious coating was measured as follows. The cementitious coating of example 3 was applied in a thickness of 0.10 inches (2.5 mm) over an epoxy coating bonded to a large diameter steel pipe. A circular hole $\frac{1}{8}$ inch in diameter was drilled through the cementitious coating and epoxy coating to the steel pipe below, and was filled to its top with mercury. The mercury thus acted as a conductor between the wall of the hole in the cementitious coating and the pipe. The top of the hole was then sealed with a circular plug of silicone rubber one inch in diameter centered over the hole and extending outwardly beyond the periphery of the hole. One end of a plexiglass tube of about $3\frac{1}{2}$ inches in diameter and open at both ends was then sealed to the surface of the cementitious coating with the mercury containing hole at its centre. The plexiglass tube was filled to a depth of six inches with a solution of 5 percent NaCl in water, and a platinum anode was immersed to a depth of three inches in the solution. The steel pipe served as the cathode. A 5 volt DC potential was applied between the pipe and the anode and the current was measured with a digital readout microammeter.

The current measured initially was quite low, but as the cementitious coating (due to its porosity) absorbed the NaCl solution, the current increased. By the time 24 hours had elapsed, the current had stabilized at 5.5 milliamperes, and the current thereafter remained steady at this value.

The resistivity of the cementitious material was calculated as follows. It was assumed that the conductivities of the NaCL solution and of the steel pipe were very high compared to that of the cementitious coating and that the epoxy coating acted as an insulator. Thus the electron current travelled through the steel pipe, into the ⅛ inch diameter mercury well through the coating beneath the silicone rubber plug, into the solution at the periphery of the plug, and to the anode.

$$\text{Now resistivity} = \frac{\text{resistance} \times \text{area through which current flows}}{\text{length of current path}}$$

Here the resistance was 5/0.0055=909 ohms. The path through the cementitious coating began at the wall of the ⅛ inch hole and terminated at the edge of the one inch diameter plug and hence was 7/16 inch or 1.11 cm in length.

The area through which the current flowed was not uniform. At the wall of the hole the area was $\pi \times \frac{1}{8}$ inch $\times 0.1$ inches (the coating thickness) or 0.0393 square inches of 0.253 cm². At the periphery of the one inch plug the area was $\pi \times 1$ inch $\times 0.1$ inches or 0.314 square inches of 2.03 cm². The area was arbitrarily chosen as the average of these two values or 1.14 cm².

Thus the resistivity was $(909 \times 1.14)/1.11 = 934$ ohm cm.

This resistivity was low enough to allow ample current to flow for cathodic protection of a pipeline. It is estimated that the resistivity could be as high as about 3500 ohm cm. and still allow sufficient current flow for reasonable cathodic protection of the pipeline.

FIG. 1 shows an important application of the invention, namely a portion of a submarine pipeline. In FIG. 1, the thickness is exaggerated for clarity. As shown, the pipeline includes a steel pipe 2 which may or may not be buried in the sea bottom 4. The pipe 2 is coated with an epoxy protective coating 6, which in turn is coated with the thin cementitious coating 8 of the invention. A cement weight coating 10 is applied, to counteract the buoyancy of the empty pipe and also to provide protection against trawlers and other objects. The weight coating 10 is commonly between 2 inches and 6 inches in thickness. The thin cementitious coating 8 protects the epoxy coating 6 against the impact of the aggregates in the weight coating, as well as against damage during handling prior to application of the weight coating. Because the aggregates in the thin cementitious coating are fine and are applied under well controlled conditions, they will not damage the epoxy or other corrosion protective coating.

Although the invention has been described for use with metal pipes, it may be used with any metal substrate having a corrosion protective coating, to protect that coating. For example it may be used for oil drilling rigs, offshore structures, structural and non-structural steel members, bridges, and refineries. The thickness of the coating may also be greater than that previously described; for example the cementitious coating may be applied in a layer up to about 12 mm in thickness, although thinner coatings are much preferred due to their lower weight and reduced tendency to crack and fall off the substrate to which they are applied. Where cathodic protection through the coating is required, increased conductivity can if necessary be achieved by the use of more conductive aggregates such as iron in the coating.

In addition, although the thin coating has been described as cementitious, it is possible to use coatings in which aggregates are held together with polymers rather than with cement. Such coatings are essentially plastic coatings with aggregates and/or fibres therein to provide protection to the corrosion protection coating. However cementitious coatings are preferred because such coatings are relatively inexpensive and perform well.

FIG. 2 shows diagrammatically a plant incorporating continuous mixing equipment to assist in achieving a uniform deposit of the thin cementitious coating on a corrosion protection coating 6 on a pipe 2. The plant of FIG. 2 comprises feed hoppers 12, 14, 16 which feed the dry materials (cement, aggregates and fibres) to a common feed hopper 18. The hopper 18 feeds these materials into a preparation chamber 20. A shaft 22 extends through the chamber 20 and also through a constricted passage 24 and through a wet mixing chamber 26. The shaft 22 is turned by a motor 28.

In the chamber 20, paddles 30 are connected to the shaft 22 and provide some premixing of the dry materials. The mixed materials are then fed by a dosage auger 32 (also mounted on shaft 22) into the wet mixing chamber 26.

The liquids used in the process, namely water and the polymer suspension, are fed into the wet mixing chamber 26 from sources 34, 36 respectively. The water is fed into chamber 26 via a duct 38 located upstream from the duct 40 through which the polymer suspension is supplied. The water spray adjacent the exit of the constricted passage 24 helps keep the polymer (which acts as a glue) away from the exit from passage 24 and hence helps prevent clogging of this passage and also helps prevent blockage of the entrance to mixing chamber 26.

In mixing chamber 26 the materials are mixed by paddles 42 fixed to the shaft 22 and are also conveyed through chamber 26 by a slight angular mounting of the paddles 42. The mixed materials leave chamber 26 at exit 44 and fall into a feed hopper 46 which feeds conventional but fine bristled counter-rotating brushes 48,50. The brushes 48,50 spray the mixed materials onto the corrosion protection coating 6 of the pipe 2.

The process described allows continuous feed of the components of the thin cementitious coating and their continuous application to a pipe. Batch mixing is not required. The continuity of the process aids in achieving a more uniform coating, which is highly desirable in applying thin coatings. In contrast, in a batch process, the thickness of the mixture varies with time and may also vary from batch to batch, creating difficulty in achieving uniformity in the coating.

We claim:

1. In combination with an elongated metal pipe having a thin smooth corrosion protective coating thereon, said corrosion protective coating being one of an epoxy coating, a polyethylene coating, a polyurethane coating and a coal tar coating, a thin cementitious coating adhered to said corrosion protective coating to provide protection for said corrosion protective coating, said cementitious coating being capable of flexing with said pipe and comprising: a cementitious material, a fine filler material of quantity in the range of 0 to 3.5 parts by weight per part of said cementitious material, a polymeric material of quantity in the range 0.05 to 0.55 parts by weight of polymer solids per part of said cementitious material, chopped fibres or flakes of quantity in the range 0 to 0.20 parts by weight per part of said cementitious material, the thickness of said cementitious coating being between 0.5 to 5.0 millimeters, said coating adhering to said corrosion protective coating, said cementitious coating having substantial electrical conductivity when saturated with water, to enable cathodic protection of said pipe by an electric current conducted through said cementitious coating.

2. The combination according to claim 1 wherein the quantity of said filler material is in the range 1.0 and 3.0 parts by weight per part of said cementitious material, the quantity of said polymer solids is in the range 0.1 to 0.3 parts by weight per part of said cementitious material, and the quantity of said fibres or flakes is in the range 0.01 to 0.10 parts by weight per part of said cementitious material.

3. The combination according to claim 2 wherein said coating is of thickness in the range between 1 and 3 millimeters.

4. The combination according to claim 1, claim 2 or claim 3 wherein said polymeric material is an acrylic polymer.

5. The combination according to claim 1, claim 2 or claim 3 wherein the polymeric material is a butadiene/styrene copolymer.

6. The combination according to claim 1, claim 2 or claim 3 wherein the polymeric material is a vinyl acetate polymer.

7. The combination according to claim 1 wherein said pipe is part of a submarine pipeline, said combination further including a concrete weight coating adhered to said thin cementitious coating to counteract the buoyancy of said pipe when said pipe is filled with a substance lighter than water.

8. The combination according to claim 1, claim 2 or claim 3 wherein said fibres are glass fibres.

9. The combination according to claim 1 wherein said filler material is sand present in a quantity of substantially 250 parts by weight per part of said cementitious material, said fibres are glass fibres present in a quantity of substantially 2.5 parts by weight per part of said cementitious material, said polymeric material being an acrylic polymer provided in the form of a latex dispersion in a quantity of substantially 31 parts by weight per part of said cementitious material, said dispersion consisting of substantially 53 percent water and the remainder said acrylic polymer, said cementitious material being portland cement.

10. The combination according to claim 9 wherein the thickness of said cementitious coating is between 1.5 and 3 millimeters, said corrosion protective coating being an epoxy coating.

11. A submarine pipeline comprising: a metal pipe having a corrosion protecting coating thereon, said corrosion protective coating being one of an epoxy coating, a polyethylene coating, a polyurethane coating and a coal tar coating, a thin cementitious coating adhered to said corrosion protecting coating to provide mechanical protection for said corrosion protecting coating, said thin cementitious coating having substantial electrical conductivity when saturated with water, to enable cathodic protection of said pipe by an electrical current conducted through said cementitious coating, and a concrete weight coating adhered to said thin cementitious coating to counteract the buoyancy of said pipe when said pipe is filled with air.

12. A pipeline according to claim 11 wherein the thickness of said thin coating is between 0.5 and 5.0 mm.

13. A pipeline according to claim 11 or 12 wherein said coating comprises a cementitious material, a fine filler material of quantity in the range of 0 to 3.5 parts by weight per part of said cementitious material, a polymeric material of quantity in the range 0.05 to 0.55 parts by weight of polymer solids per part of said cementitious material, and chopped fibres or flakes of quantity in the range 0 to 0.20 parts by weight per part of said cementitious material.

14. A process for applying a concrete weight coating having large aggregate therein to a pipe having a corrosion protecting coating thereon, said corrosion protective coating being one of an epoxy coating, a polyethylene coating, a polyurethane coating and a coal tar coating, said process comprising: adhering to said corrosion protecting coating a thin cementitious coating to provide mechanical protection for said corrosion protecting coating, said thin cementitious coating having substantial electrical conductivity when saturated with water, to enable cathodic protection of said pipe by an electrical current conducted through said thin cementitious coating, and they applying said concrete weight coating over said thin cementitious coating, said thin cementitious coating acting as a buffer to protect said corrosion protecting coating against the impact of aggregates in said weight coating.

15. The process of claim 14 wherein said thin cementitious coating is of thickness between 0.5 and 5.0 mm.

16. The process of claim 15 wherein said coating comprises a cementitious material, a fine filler material of quantity in the range of 0 to 3.5 parts by weight per part of said cementitious material, a polymeric material of quantity in the range of 0.05 to 0.55 parts by weight of polymer solids per part of said cementitious material, and chopped fibres or flakes of quantity in the range 0 to 0.20 parts by weight per part of said cementitious material.

* * * * *